US008076868B2

(12) United States Patent
Chien

(10) Patent No.: US 8,076,868 B2
(45) Date of Patent: Dec. 13, 2011

(54) LED DRIVER AND POWER CONTROL CIRCUIT WITH SPREAD SPECTRUM FREQUENCY MODULATION FUNCTION AND DISPLAY PANEL USING THE SAME

(75) Inventor: Hung Jen Chien, Hsin-Chu (TW)

(73) Assignee: Orise Technology Co., Ltd., Hsinchu (TW)

( * ) Notice: Subject to any disclaimer, the term of this patent is extended or adjusted under 35 U.S.C. 154(b) by 437 days.

(21) Appl. No.: 12/414,304

(22) Filed: Mar. 30, 2009

(65) Prior Publication Data

US 2010/0033110 A1    Feb. 11, 2010

(30) Foreign Application Priority Data

Aug. 7, 2008   (TW) ................................ 97129991 A

(51) Int. Cl.
*G05F 1/00* (2006.01)
*H05B 37/02* (2006.01)
(52) U.S. Cl. ...................... 315/294; 315/291; 315/185 R
(58) Field of Classification Search .............. 315/185 R, 315/122, 192, 193, 291, 294, 297, 307
See application file for complete search history.

(56) References Cited

U.S. PATENT DOCUMENTS

| 4,418,406 | A * | 11/1983 | Ogawa ........................ 369/59.17 |
| 7,235,954 | B2 * | 6/2007 | Murakami ..................... 323/222 |
| 7,564,434 | B2 * | 7/2009 | Kim .................................. 345/82 |
| 7,740,371 | B1 * | 6/2010 | Lebens et al. ................... 362/205 |
| 7,961,158 | B2 * | 6/2011 | Chou et al. ....................... 345/82 |
| 2009/0128045 | A1 * | 5/2009 | Szczeszynski et al. ... 315/185 R |

* cited by examiner

*Primary Examiner* — Vibol Tan
(74) *Attorney, Agent, or Firm* — Muncy, Geissler, Olds & Lowe, PLLC

(57) ABSTRACT

The present invention relates to an LED driver, power control circuit and display panel using the same. The LED driver has the function of spread spectrum frequency modulation (SSFM). The circuit topology of the driver includes a power converter, an error amplifier, a feedback circuit, a saw-tooth generator and a driving circuit. The present invention adds the SSFM circuit in the saw-tooth generator to generate a time variant current according to time variant function, so that the saw-tooth wave could be changed by the time variant current as mentioned above. Therefore, the frequency of the driving pulse generated by the LED driver will be varied as time. As the result, the reduction of the electro-magnetic interference (EMI) can be achieved.

13 Claims, 7 Drawing Sheets

LED DRIVER AND POWER CONTROL CIRCUIT WITH SPREAD SPECTRUM FREQUENCY MODULATION FUNCTION AND DISPLAY PANEL USING THE SAME

This application claims priority of No. 097129991 filed in Taiwan R.O.C. on Aug. 8, 2008 under 35 USC 119, the entire content of which is hereby incorporated by reference.

BACKGROUND OF THE INVENTION

1. Field of Invention

The invention relates to a power supply technology, more particular to a power supply control circuit with frequency expansion modulation, a light emitting diode (hereinafter referring to as LED) driver and a display module using the same.

2. Related Art

As the development of the photo electronics and semiconductor technology, the flat panel display is also rising and flourishing. Among many flat panel displays, the liquid crystal display (hereinafter referring to as LCD) becomes the main stream in the display market due to the characteristics of high space utility efficiency, low power consumption, low radiation and low electromagnetic interference (EMI). The LCD comprises a liquid crystal display panel and a backlight module. Since the LCD panel cannot radiate light itself, a backlight module is required to provide a surface light source to the LCD panel to enable its display function. The conventional backlight module uses a cold cathode fluorescent lamp (CCFL) as the light source. However, as the development of the small display device and the power consumption demand of the small mobile devices, the LED is adopted for the light source of the backlight module.

FIG. 1 is a circuit diagram showing the conventional LED driver circuit. Referring to FIG. 1, the basic operation of the circuit is to utilize a boost converter to raise the input voltage to a conductible voltage level to drive a series of LEDs, and then to utilize a constant current controller to control a constant current flowing through the LEDs, so that the LEDs can be used to generate a stable light source.

In addition, in the above-mentioned example, the boost converter in FIG. 1 further comprises an inductor L101, a rectify diode D101, a capacitor C101 and a power control circuit IC101, wherein the power control circuit IC101 comprises a constant current control circuit CI, a feedback selection circuit FBS, a reference voltage generator REFG, an error amplifier ERRAMP, a pulse width modulation comparator PWMCMP, a saw-tooth generator STG, a mixer MIX, a clock generator CKG, a current sensing amplifier CSAMP, a set-reset latch SR-LATCH, a gate driver GD, a power transistor PM and a current sensing resistor RCS.

The operation of the boost converter is to convert the difference between the feedback voltage VFB and the reference voltage VREF to a current by the error amplifier ERRAMP and to charge the first order low-pass filter, which is composed of an external resistor Rc and an external capacitor Cc, to obtain an error voltage VEER. At this moment, a clock signal CK, which is generated by the saw-tooth ST, is utilized to set the Q output terminal of the set-reset latch SR-LATCH to a high voltage level and the high voltage level of the Q output terminal conducts the power transistor PM through the gate driver GD and the current IL starts to charge the inductor L101. Thereafter, the voltage on the current sensing resistor RCS is amplified by the current sensing amplifier CSAMP and mixed with the saw-tooth ST generated by the saw-tooth generator STG in the mixer MIX. Thereafter, a mixed saw-tooth signal MST is produced. When the voltage level of the mixed saw-tooth signal MST goes up to reach the error voltage VERR level, the pulse width modulation comparator PWMCMP outputs a high voltage after the comparison, and the high voltage is used for setting the Q output terminal of set-reset latch SR-LATCH to a low voltage level. The low voltage level of the Q output terminal turns the power transistor PM off through the gate driver GD and at the current IL stops charging the inductor IL101, due to the continuity of the inductor current on the inductor L101, the energy stored in the inductor IL101 is discharged at the output terminal VOUT through the rectified diode D101 and to drive load, and an operation cycle of the boost converter is complete.

Under the operation cycle of charging and discharging mentioned above, the pulse width modulation comparator PWMCMP generates a square wave with constant frequency, whose pulse width varies with the load, and the described above herein is the operating principle of the pulse width modulation power converter.

In today's world, the science and technology are changing day by day, many kinds of electrical products, communication products, and information products have become our necessities in our daily life. The usage of all these products suffers the non-continuity of current and voltage to result in an electric field and magnetic field, so that an interference phenomenon is formed. Such interference is an invisible pollution of our environment. The cell phone, television, telephone will not only be affected to reduce our life quality, but the safety of the flight is endangered, and even more the human body may be influenced. In view of this, more and more countries request that the electrical products must pass the Electromagnetic Compatibility (EMC) test before the products enter the market. No doubt the switch mode power supply (SMPS) is a major EMI source.

The fundamental frequency and its harmonics are the main source of the electromagnetic interference of the common used pulse width modulation (PWM) power converter. However, the solutions of many manufacturers to against the electromagnetic interference are still stayed on building electromagnetic shields to block the interference source, and there is still no effective solution to solve EMI issue from its source.

SUMMARY OF THE INVENTION

It is therefore an object of the present invention to provide a display module which comprises an LED backlight module and utilizes the spread spectrum frequency modulation (hereinafter referring to as SSFM) to reduce the electromagnetic interference thereof.

Another object of the present invention is to provide an LED driver for driving the LEDs and reducing the electromagnetic interference by utilization of the SSFM.

Further object of the present invention is to provide a power control circuit for reducing the electromagnetic interference of the controlled power converter by utilization of the SSFM.

To achieve the above-identified or other objects, the present invention provides a display module which comprises a transmissive display panel and a backlight module. The backlight module is disposed on the back side of the transmissive display panel to provide the transmissive display a backlight source, and the backlight module further comprises an LED series and the LED driver of the present invention, wherein the LED driver further comprises a power control circuit of the present invention and a power converter. The power converter receives a driving pulse outputted from the power control circuit to generate a driving voltage to a first terminal of the LED series, and the power control circuit comprises a constant current control circuit, a feedback circuit, an error amplifier circuit, a saw-tooth generator and a power converter driving circuit, wherein the saw-tooth generator comprises a variable current source and a peak detector. The constant current control circuit is coupled to a second terminal of the LED series to control the current flowing through the LED series. The feedback circuit is coupled to the second terminal of the LED series to generate a feedback voltage. The error amplifier circuit receives a first reference voltage and the feedback voltage to generate an error voltage. The variable current source generates a time variant current according to a time variant function. The peak detector generates a time variant saw-tooth voltage corresponding to the value of the time variant current, wherein the time variant voltage is reset when the time variant saw-tooth voltage is larger than a second reference voltage. The power converter driving circuit receives the time variant saw-tooth voltage and the error voltage to generate the driving pulse.

According to the display module, LED driver, and the power control circuit of the preferred embodiment of the invention, the said variable current source comprises a current mirror circuit and a plurality of switching devices. The current mirror circuit comprises a plurality of current output paths, generates a plurality of specific currents according to a reference current, wherein each of the specific currents are in proportion to the reference current. A first terminal of each switching device is correspondingly coupled to each of the current output paths, and a second terminal of each switching device is coupled to the peak detector. The numbers of the conduction switching devices vary according to the time variant function.

According to the display module, LED driver, and the power control circuit of the preferred embodiment of the invention, each switching device also comprises a control terminal, and the variable current source further comprises a clock generating circuit, a divider, a plurality of multiplexing circuit and a decoder. The clock generating circuit is used to generate a clock signal. The divider is coupled to the clock generating circuit to receive the clock signal and to generate a plurality of frequency divided signals, wherein the frequency divided signals have different frequencies. Each multiplexing circuit comprises a selection terminal, a first input terminal, a second input terminal and an output terminal. The selection terminal of each multiplexing circuit receives a relatively lowest frequency signal of the frequency divided signals, the first terminal of each multiplexer circuit receives the corresponding frequency divided signal, and the second terminal of each multiplexing circuit receives an inverted signal of the corresponding frequency divided signal. The decoder comprises a plurality of input terminals and a plurality of output terminals. The input terminals of the decoder are coupled to the output terminals of the multiplexing circuits to generate a plurality of switching signals and to correspondingly output the switching signals through the output terminals of the decoder. The output terminals of the decoder are respectively coupled to the control terminals of the said switching devices. The switching signals is used for determining the conducting status of the each of the switching devices.

According to the display module, LED driver, and the power control circuit of the preferred embodiment of the invention, the peak detector also comprises a charging switch, a capacitor, a reset switch, and a comparator. The charging switch comprises a first terminal, a second terminal, and a control terminal, the first terminal thereof receives the time variable current, and the control terminal thereof receives a control signal. The capacitor comprises a first terminal and a second terminal, the first terminal thereof is coupled to the second terminal of the charging switch, the second terminal thereof is coupled to a common voltage. The reset switch comprises a first terminal, a second terminal, and a control terminal, the first terminal thereof is coupled to the first terminal of the capacitor, the second terminal thereof is coupled to the common voltage, and the control terminal thereof receives the control signal. The comparator comprises a first input terminal, a second input terminal, and an output terminal, the first input terminal thereof is coupled to the first terminal of the capacitor, the second input terminal thereof receives the said second reference voltage, and output terminal thereof outputs the control signal. when the voltage of the first terminal of the capacitor is lower than the second reference voltage, the control signal is used for conducting the charging switch and disconnecting the reset switch, when the voltage of the first terminal of the capacitor is larger than the second reference voltage, the control signal is used for conducting the reset switch and disconnecting the charging switch.

According to the display module, LED driver, and the power control circuit of the preferred embodiment of the invention, the power converter driving circuit comprises a comparator, a set-reset latch, and a gate driving circuit. The comparator comprises a first input terminal, a second input terminal, and an output terminal, the first input terminal thereof receives the time variant saw-tooth voltage, the second input terminal thereof receives the error voltage, the output terminal outputs a pulse control signal. The set-reset latch comprises a set terminal, a reset terminal and a Q output terminal, the set terminal thereof receives a clock signal, the reset terminal thereof is coupled to the output terminal of the comparator. The gate driving circuit comprises an input terminal and an output terminal, the input terminal thereof is coupled to the Q output terminal of the set-reset latch, and the output terminal thereof outputs a gate driving voltage. In the further embodiment, the power converter driving circuit further comprises a power transistor, an impedance element, and a mixer. The power transistor comprises a gate terminal, a first source-drain terminal and a second source-drain terminal, the gate terminal thereof is coupled to the output terminal of the gate driving circuit to receive the gate driving voltage, and the second source-drain terminal thereof is coupled to the power converter and outputs the driving pulse. The impedance element comprises a first terminal and a second terminal, the first terminal thereof is coupled to the first source-drain terminal of the power transistor, the second terminal thereof receives a common voltage, and the first terminal thereof generates a current sensing voltage corresponding to the current flowing through the power transistor. The mixer is coupled to the first terminal of the comparator, the saw-tooth generator, and the first source-drain terminal of the power transistor. The mixer is adapted for mixing the time variant saw-tooth voltage and the current sensing voltage to obtain a mixed saw-tooth voltage and output the mixed saw-tooth voltage to the first terminal of the comparator.

In summary, the spirit of the invention is to add a spread spectrum frequency modulation circuit into the saw-tooth generator. The main goal is to control the current source of the saw-tooth generator to generate a time variant current according to a time variant function, so that the saw-tooth signal can vary with the time variant current mention above. Therefore, the frequency of the driving pulse of the LED driver varies with time, and the electromagnetic interference can be reduced.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
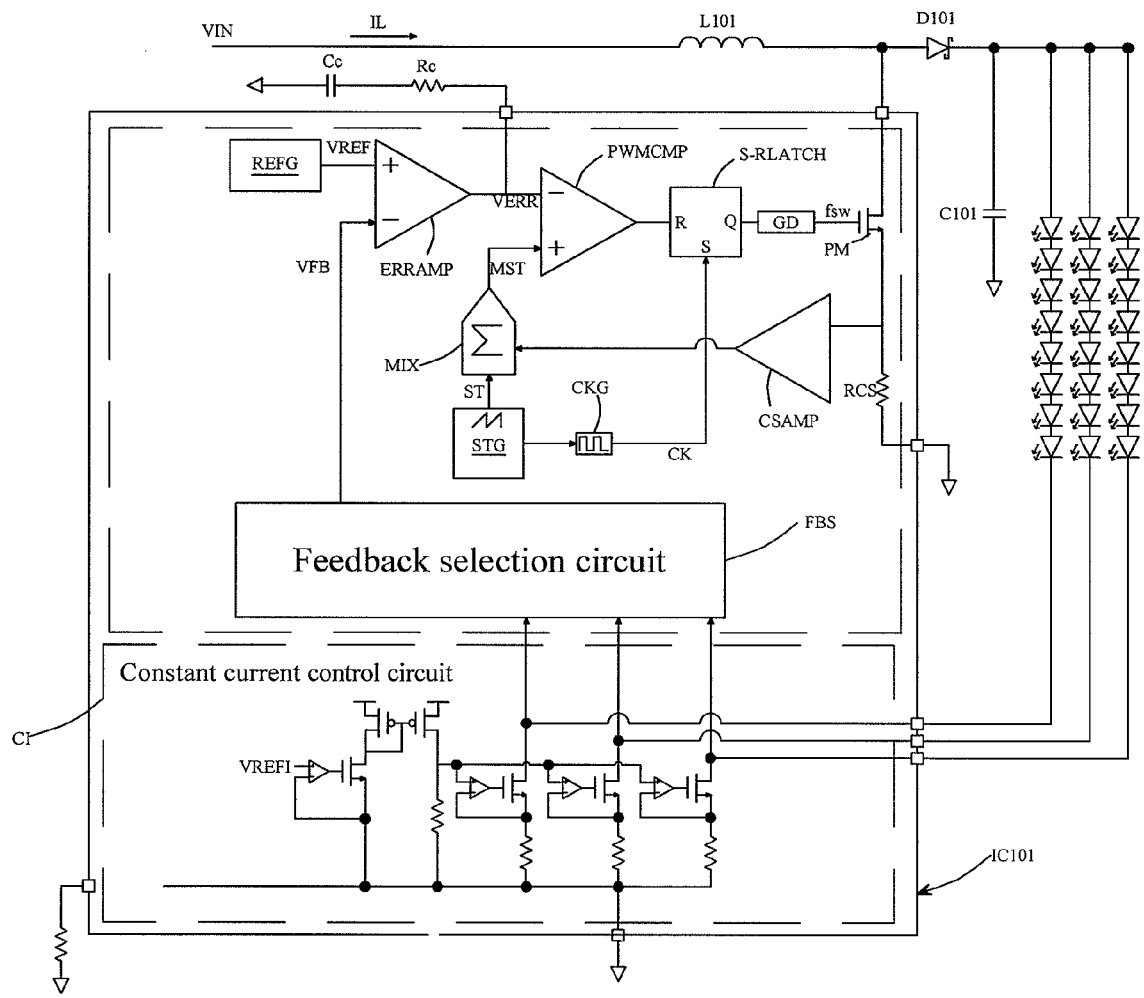
FIG. 1 is a circuit diagram showing the conventional LED driver circuit.
Figure 2:
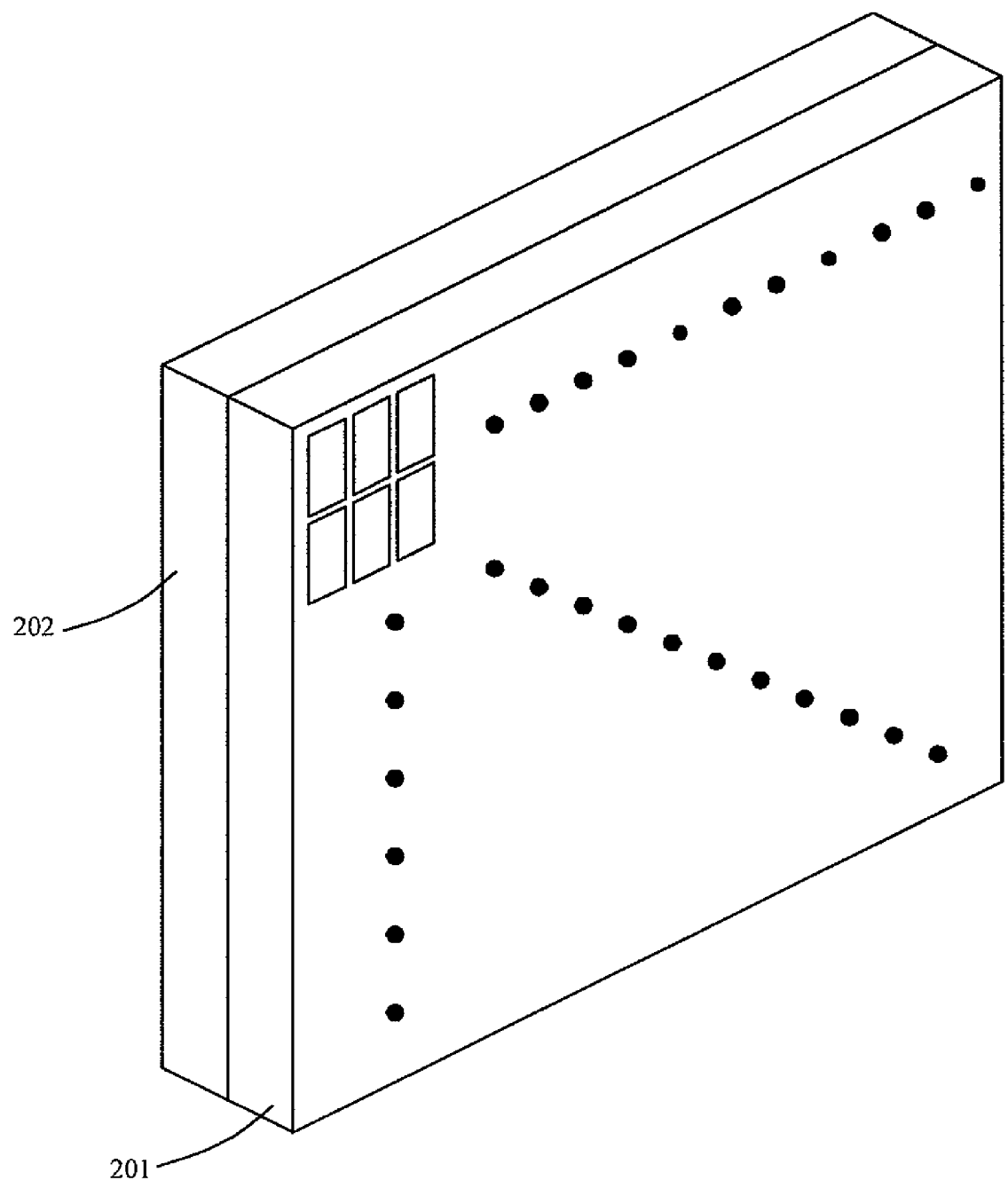
FIG. 2 is a system block diagram depicting a display module according to an embodiment of the present invention.

FIG. 2 is a system block diagram depicting a display module according to an embodiment of the present invention. Referring to the FIG. 2, the display module comprises a transmissive display panel 201 and a backlight module 202. The backlight module 202 is disposed on the back side of the transmissive display panel 201 to provide the transmissive display panel 201 a backlight source. The backlight module 202 usually comprises a light source, a light guide, a diffuser, and so on. The discussion is mainly focused on the light source. In this embodiment, the light source of the backlight module 202 comprises a light emitting diode series and an LED driver of the embodiment of the present invention. The followings are based on the LED driver of the embodiment of the present invention to illustrate the spirit of the present invention.

Figure 3:
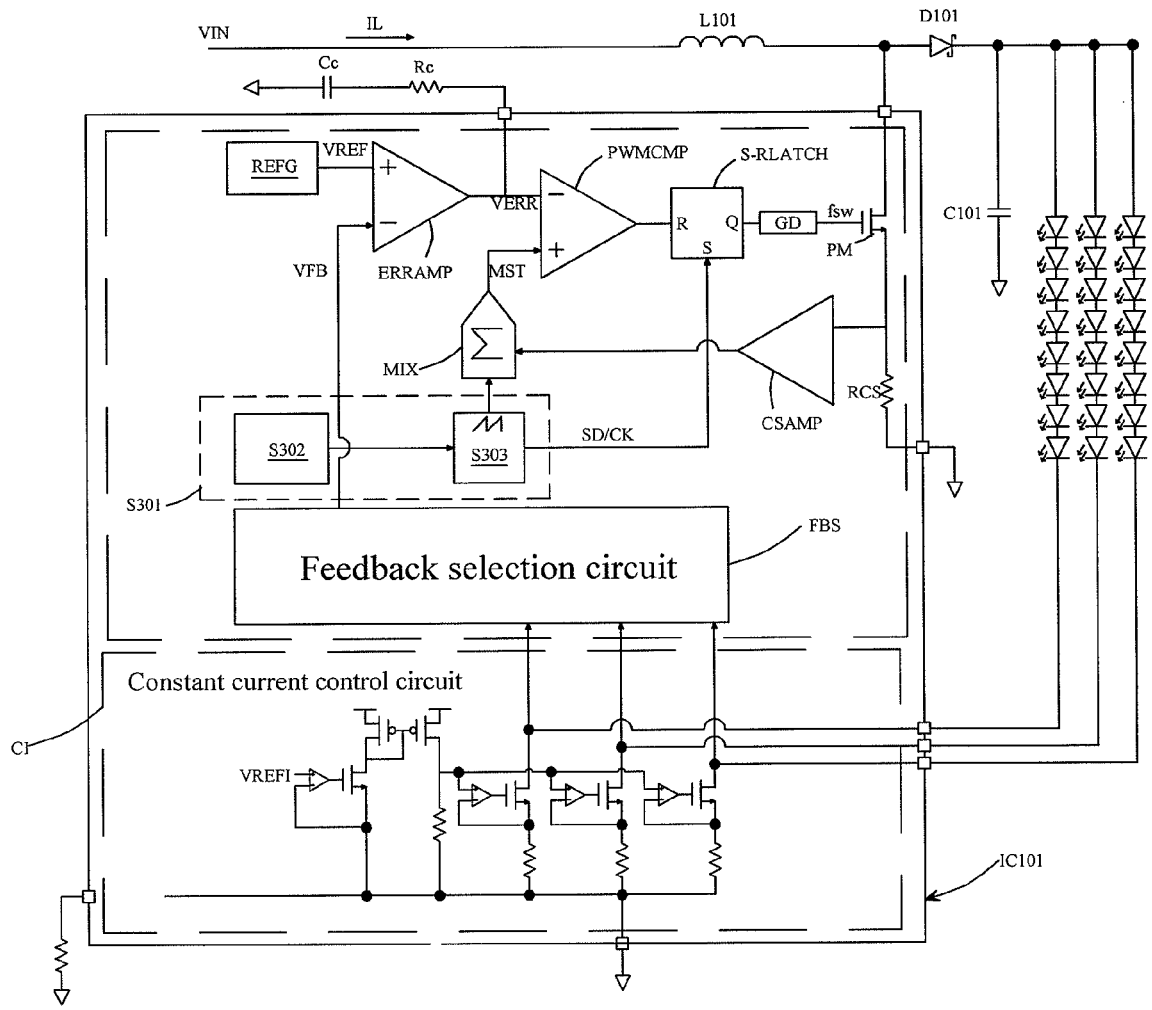
FIG. 3 is an LED driver circuit according to the embodiment of the present invention.

FIG. 3 is the LED driver circuit diagram according to an embodiment of the present invention. Referring to the FIG. 3, a boost type power converter is an example of the LED driver circuit. The boost type converter has been mentioned in the prior art and will not be discussed here repeatedly. One having ordinary skills in the art may easily understand that the primary difference between the present invention and the traditional circuit is the saw-tooth generator S301. The saw-tooth generator S301 can be mainly divided into a variable current source S302 and a peak detector S303. The variable current source S302 generates a time variant current according to a time variant function. The peak detector S303 generates a time variant saw-tooth voltage according to the value of the time variant current. The following diagrams illustrate a more detailed circuit, so that one having ordinary skills in the art could implement the spirit of the present invention.

Figure 4:
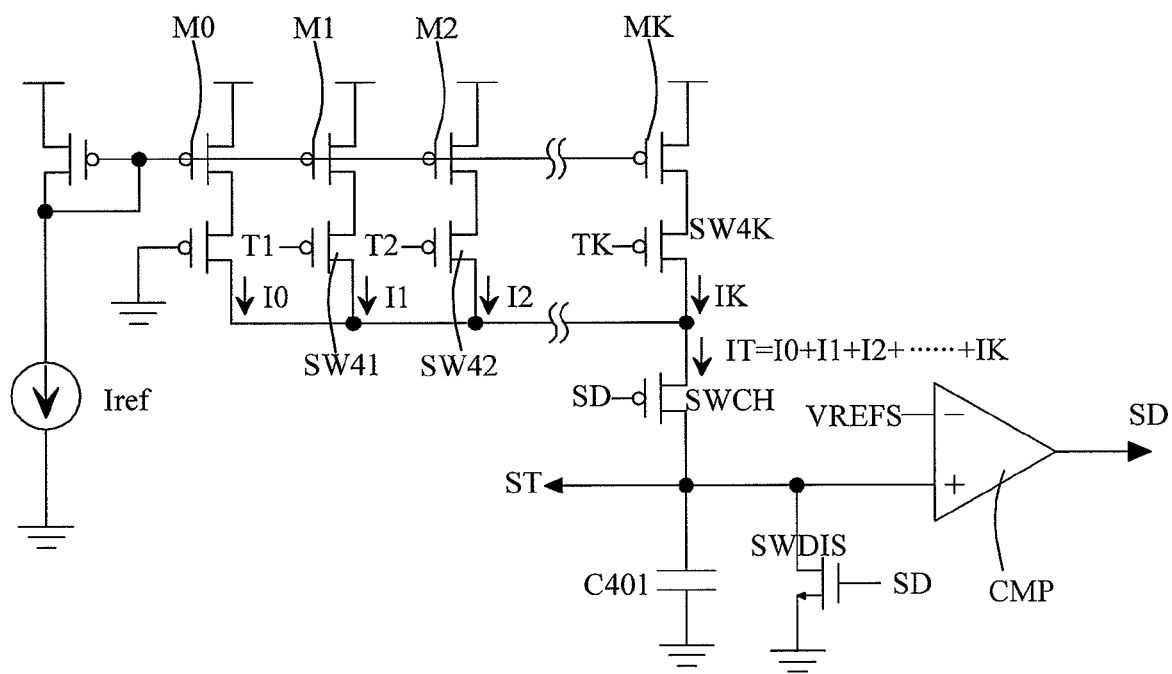
FIG. 4 is a detailed circuit of saw-tooth generator S301 according to an embodiment of the present invention.

FIG. 4 is the detailed circuit diagram of the saw-tooth generator S301 according to an embodiment of the present invention. Referring to FIG. 4, the circuit comprises a current mirror circuit 401, a plurality of switching devices SW41, SW42 . . . SW4K, a capacitor C401, a charge switch SWCH, a discharge switch SWDIS, and a comparator CMP. The current mirror circuit 401 is composed of a current mirror. When each of the transistor M0, M1, M2 . . . and MK has the same length to width ratio, each current I0, I1, I2 . . . IK are the same, and also the current I0, I1, I2 . . . IK are in proportion to a reference current Iref. The switching devices SW41, SW42 . . . SW4K are mainly used to control the current IT flowing into the capacitor C401.

The operation of the saw-tooth generator S301 is to charge the capacitor C401 by the current IT. When the voltage of the capacitor C401, which is the saw-tooth signal ST, is larger than a reference voltage VREFS, the output voltage SD of the comparator CMP is a positive saturation voltage. Therefore, the discharge switch SWDIS is turned on and the charge switch SWCH is turned off. Then, the capacitor C401 is discharged in a short time, and the output voltage SD of the comparator CMP is changed from a positive saturation voltage to a negative saturation voltage. Meanwhile, the discharge switch SWDIS is turned off and the charge switch SWCH is turned on. Therefore, a saw-tooth signal ST is produced. In addition, the output voltage SD of the comparator CMP could be taken as a clock signal CK which is generated by the saw-tooth generator S301. The clock signal CK is also an important parameter to control the LED driver. The method for determining the switching frequency of the clock signal CK and the saw-tooth signal ST has been discussed in prior art, so that the detail description is omitted.

Figure 5:
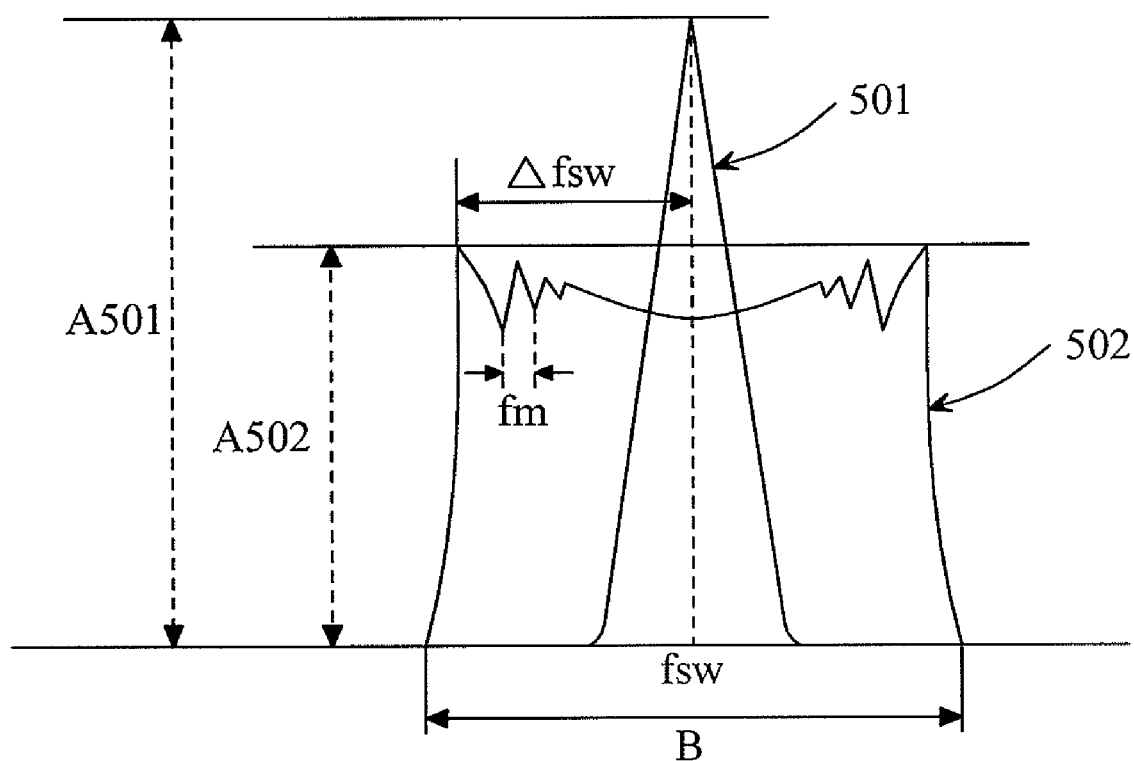
FIG. 5 is a frequency spectrum of the SSFM according to an embodiment of the present invention.

From the operation mentioned above, it can be observed that the current IT is the main factor to dominate the frequency of the saw-tooth signal ST. In other words, the frequency of the saw-tooth ST can be adjusted by controlling the switching devices SW41, SW42 . . . SW4K. In comparison, if the currents I1, I2 . . . IK are well controlled, the current IT can varies periodically with time, and it can be achieved that the saw-tooth signal ST is modulated as the Spread Spectrum Frequency Modulation (SSFM) function. FIG. 5 is a frequency spectrum of the SSFM according to an embodiment of the present invention. Referring to FIG. 5, the symbol 501 illustrates the frequency spectrum of the baseband signal of the driving pulse of the LED driver. The symbol 502 illustrates the frequency spectrum of the driving pulse of the LED driver after the SSFM. The symbol A501 illustrates the amplitude of the baseband signal. The symbol A502 is the amplitude whose signal is modulated by the SSFM. The symbol fsw illustrates the baseband frequency without the SSFM. The symbol Δfsw illustrates the variation of the switching frequency. The symbol B illustrates the bandwidth whose signal is modulated by the SSFM. As shown in the frequency spectrum diagram, the SSFM could spread the energy of the baseband signal to the side band.

Figure 6:
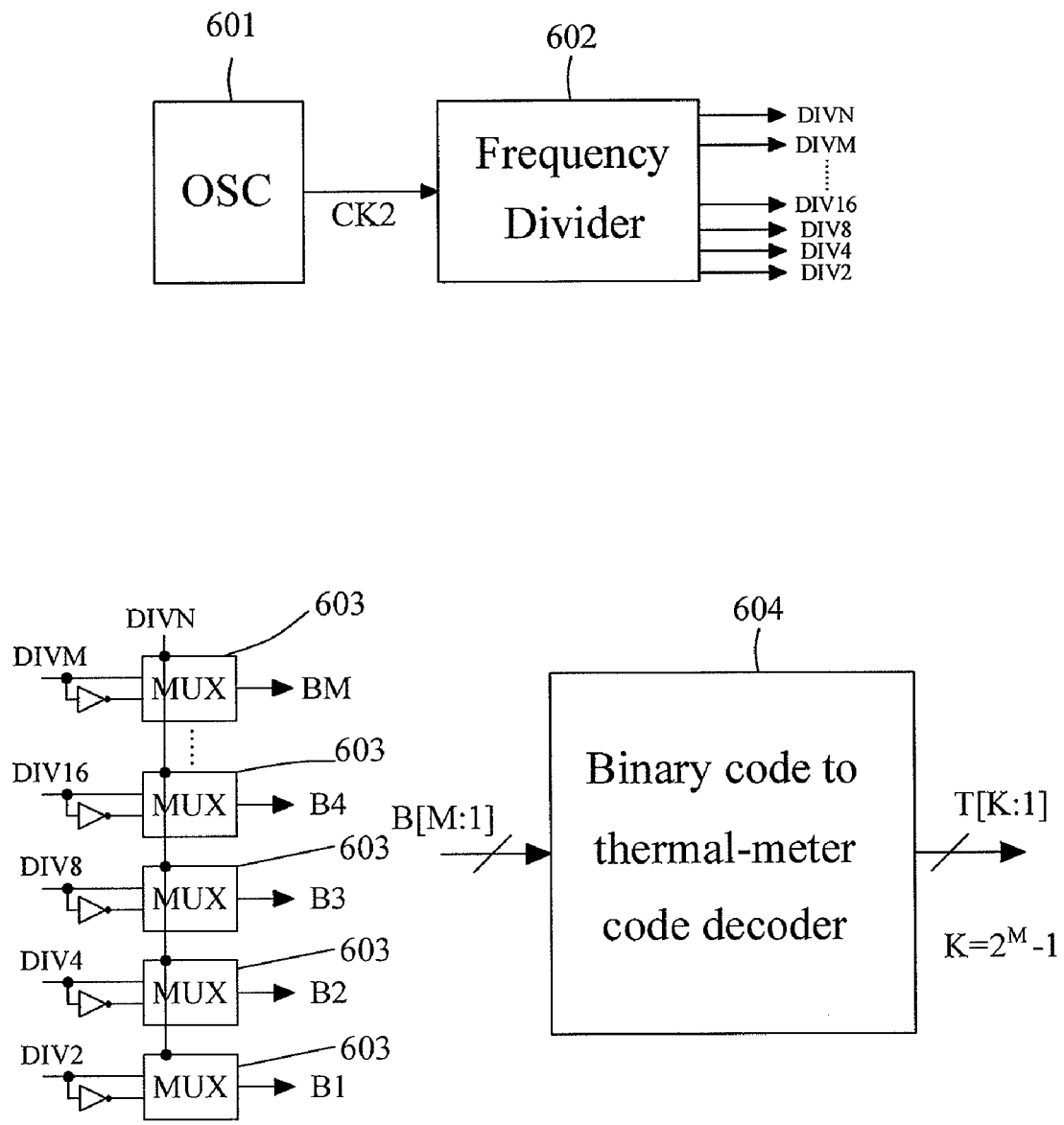
FIG. 6 is an SSFM logic circuit diagram according to an embodiment of the present invention.
Figure 7:
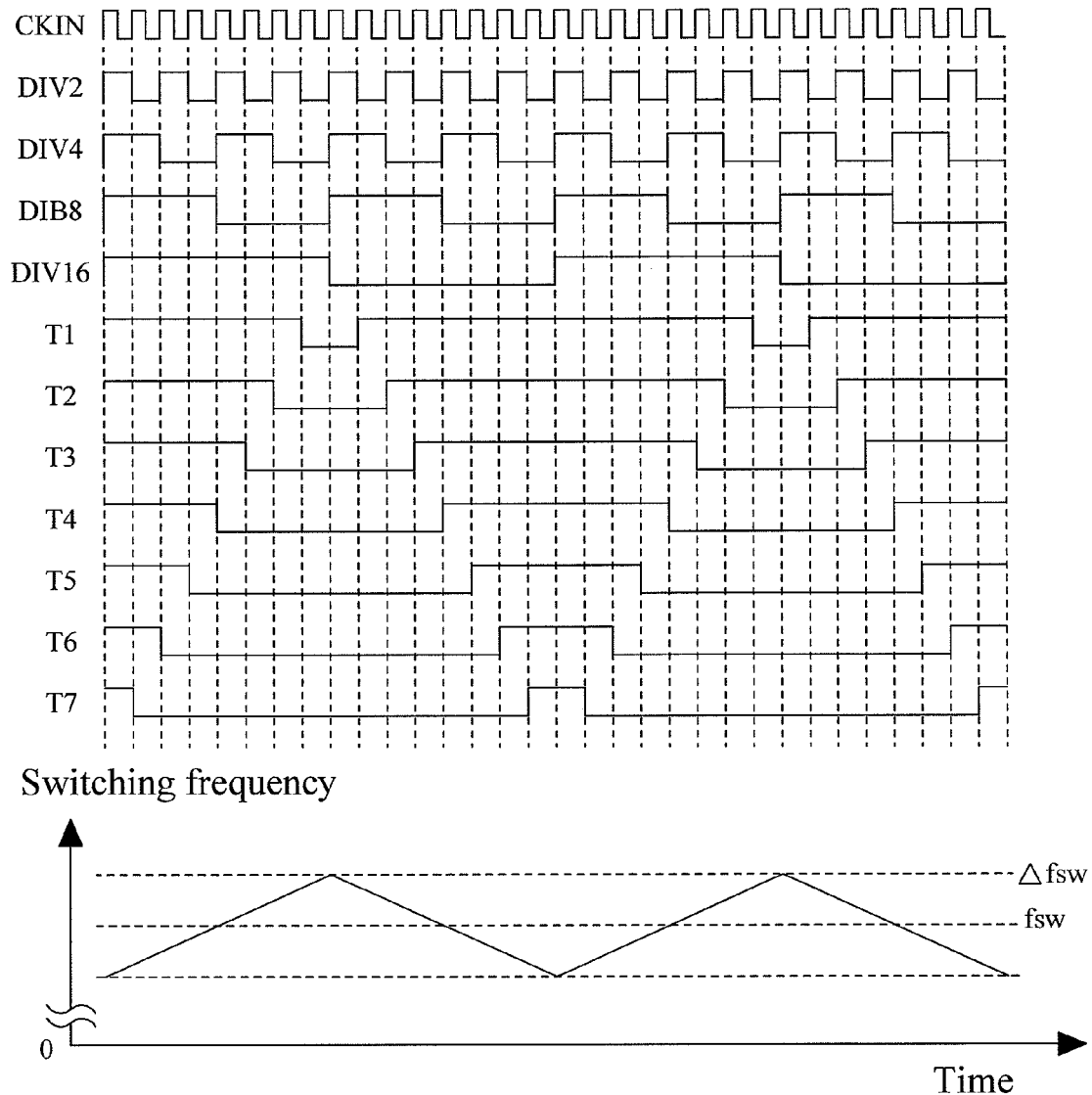
FIG. 7 is an operation waveform diagram of the SSFM logic circuit according to an embodiment of the present invention.

FIG. 6 is the SSFM logic circuit diagram according to an embodiment of the present invention. The circuit is mainly used for controlling the switching devices SW41, SW42 . . . SW4K to change the current IT into a periodic signal which varies with time. The circuit comprises an oscillator 601, a frequency divider 602, a multiplexer 603, and a binary code to thermal-meter code decoder 604. The purpose of this circuit is to change the waveform of the current IT into a triangular waveform. FIG. 7 is an operation waveform diagram of the SSFM logic circuit according to an embodiment of the present invention. Referring to FIG. 6 and FIG. 7, in order to enable one having ordinary skills in the art to understand the present invention, the circuit diagram and operation of waveform diagram are used together to illustrate the spirit of the present invention.

The operation theorem of the SSFM logic circuit is to generate a clock signal CK2 with low frequency by the oscillator 601 at first. Next, the clock signal CK2 is transmitted to the frequency divider 602 to generate the frequency divided clock signals which comprises a divided by two clock signal DIV2, a divided by four clock signal DIV4, a divided by eight clock signal DIV8 . . . DIVM . . . DIVN. These frequency divided clock signals DIV2, DIV4 . . . and their inverted clock signals are inputted into a multiplexer 603, and the relatively low frequency clock signal DIVN of the frequency divided clock signals is served as a strobe control signal of the multiplexer 603. When the relatively low frequency clock signal DIVN is at logic high voltage, the multiplexer 603 outputs the divided frequency clock signals DIV2, DIV4, . . . ; and when the relatively low frequency clock signal DIVN is at logic low voltage, the multiplexer 603 outputs the inverted divided frequency clock signals. The binary code to thermal-meter code decoder 604 determines the number of the logic high voltage which is outputted by the output terminal thereof according to the inputted digital signals.

For the simple explanation, it assumes that there are four groups of the frequency divided signals outputted by the frequency divider 602, and these four groups of the frequency divided signals are the divide by two clock signal DIV2, the divided by four clock signal DIV4, the divided by eight clock signal DIV8, and the divided by sixteen clock signal DIV16. Besides, the binary code to thermal-meter code decoder 604 is a 3 to 7 decoder. In the first cycle, the frequency divided signals DIV16, DIV8, DIV4, and DIV2 are 1111, and output of the binary code to thermal-meter code decoder 604 is 1111111, which comprises seven logic high voltages. Therefore the current IT equals the current I0. In the second cycle, the frequency divided signals DIV16, DIV8, DIV4, and DIV2 is 1110 individually, and output of the binary code to thermal-meter code decoder 604 is 1111110, which comprises six logic high voltages. Therefore the current IT equals the current I0 plus the current I1. The calculation of the rest cycles the current IT values can be achieved by the same method. As above-mentioned description, when the frequency divided signals DIV16, DIV8, DIV4, and DIV2 transforms from 1000 to 0111, the multiplexer 603 enables the inverted signals of the frequency divided signals DIV8, DIV4, and DIV2 to pass, therefore, the value received by the binary code to thermal-meter code decoder 604 is 000, then the output of the binary code to thermal-meter code decoder 604 is 0000000, which are all logic low voltage.

Therefore, the output of the binary code to thermal-meter code decoder 604 is a circulation as follows:

0000000→1000000→1100000→1110000→1111000→1111100→1111110→1111111→1111111→1111110→1111100→1111000→1110000→1100000→1000000→0000000 . . .

The circulation of the output of the thermal-meter code is equivalent to a triangular waveform with a ladder shape, and these thermal-meter codes are sent to the switching devices SW41, SW42 . . . SW4K at last, and then the waveform of the total current IT which flows through the charge switch SWCH is equivalent to a triangular waveform with a ladder shape. When the total current IT flows into the capacitor C401, the voltage on the capacitor C401, which is the saw-tooth signal ST, is charged from zero voltage. When the voltage ST on the capacitor C401 is larger than the reference voltage VREFS, the output voltage SD, which is also the system clock CK, of the comparator CMP transfers into a positive saturation voltage, so that the discharging switch SWDIS is turned on by the output voltage SD and the charge switch SWCH is turned off by the output voltage SD. And then the voltage on the capacitor C401 is instantly pulled down to zero voltage, so that a complete cycle of the saw-tooth signal is accomplished. Therefore, when the thermal-meter code, as triangle profile, enables each unit current source into conduction in order, the frequency of the saw-tooth signal ST rises up and goes down linearly in a cycle, and the SSFM could be achieved. Also, the energy of the EMI which is generated by the switching frequency could be separated to side band.

The embodiment mentioned above took DIV16, DIV8, DIV4, and DIV2 as an example. However one having ordinary skills in the art should know that the more the switching devices, which is SW41, SW42, . . . SW4K, are designed, the more approximate to a triangular shape the thermal-meter code is. But the layout area of the binary code to thermal-meter code decoder 604 becomes larger. Besides, the SSFM logic circuit for controlling the switching devices SW41, SW42 . . . SW4K, as mentioned above, is not the unique design. One having ordinary skills in the art could use any other methods, such as counter, to design it. Therefore, the present invention is not restricted thereto. In addition, the embodiment as mentioned above uses the LED driver in the backlight source, but one having ordinary skills in the art should know that the LED driver could not only be applied for the backlight source, but any other kinds of light sources. Thus, the present invention is not restricted thereto.

The spirit of the present invention is to add spread spectrum frequency modulation (SSFM) circuit into the saw-tooth generator. The main propose thereof is to control the current source of the saw-tooth generator to generate a time variant current according to a time variant function, so that the saw-tooth signal can vary corresponding to the time variant current as mentioned above. Therefore, the frequency of the driving pulse of the LED driver could vary with time, and the reduction of EMI could be achieved.

In the embodiments, it further provides that how to use a plurality of switching devices to implement a time variant current which varies with triangular wave time variant function, and it utilizes the oscillator, the frequency divider, the multiplexer, the decoder, and so on, so that a binary code to thermal-meter code decoder which could generate a triangle profile are provided to modulate the frequency of the saw-tooth signal.

In summary, the LED driver, the display module, and the power control circuit of the present invention could effectively solve the EMI problem of the traditional switching power supply circuit. The design thereof is not found in the conventional art and conforms to patentability in the Patent Law, such that a patent application is filed.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A power control circuit, adapted for controlling a power converter to drive a light emitting diode series, wherein the power converter receives a driving pulse outputted from the power control circuit to generate a driving voltage to a first terminal of the light emitting diode series, the power control circuit comprising:

a constant current control circuit, coupled to a second terminal of the light emitting diode series to control the current flowing through the light emitting diode series;

a feedback circuit, coupled to the second terminal of the light emitting diode series to generate a feedback voltage;

an error amplifier circuit, for receiving a first reference voltage and the feedback voltage to generate an error voltage;

a saw-tooth generator, comprising:
   a variable current source, for generating a time variant current according to a time variant function; and
   a peak detector, for generating a time variant saw-tooth voltage corresponding to the value of the time variant current, wherein the time variant saw-tooth voltage is reset when the time variant saw-tooth voltage is larger than a second reference voltage; and a power converter driving circuit, for receiving the time variant saw-tooth voltage and the error voltage to generate the driving pulse.

2. The power control circuit according to the claim 1, wherein the variable current source comprises:
   a current mirror circuit, comprising a plurality of current output paths, for generating a plurality of specific currents according to a reference current, wherein each of the specific currents are in proportion to the reference current; and
   a plurality of switching devices, wherein a first terminal of each switching device is correspondingly coupled to each of the current output paths, and a second terminal of each switching device is coupled to the peak detector,
   wherein the numbers of the conducted switching devices vary according to the time variant function.

3. The power control circuit according to the claim 2, wherein each switching devices further comprises a control terminal and the variable current source further comprises:
   a clock generating circuit, for generating a clock signal;
   a divider, coupled to the clock generating circuit, for receiving the clock signal and generating a plurality of frequency divided signals, wherein the frequency divided signals have different frequencies;
   a plurality of multiplexing circuits, wherein each multiplexing circuit comprises a selection terminal, a first input terminal, a second input terminal and an output terminal, the selection terminal of each multiplexing circuit receiving a relatively lowest frequency signal of the frequency divided signals, the first terminal of each multiplexer circuit receiving the corresponding frequency divided signal, and the second terminal of each multiplexing circuit receiving an inverted signal of the corresponding frequency divided signal; and
   a decoder, comprising a plurality of input terminals and a plurality of output terminals, the input terminals of the decoder coupled to the output terminals of the multiplexing circuits to generate a plurality of switching signals and to correspondingly output the switching signals through the output terminals of the decoder, the output terminals of the decoder are respectively coupled to the control terminals of the switching devices,
   wherein the switching signals is used for determining the conducting status of each of the switching devices.

4. The power control circuit according to the claim 1, wherein the peak detector comprises:
   a charging switch, comprising a first terminal, a second terminal, and a control terminal, the first terminal thereof receiving the time variant current, the control terminal thereof receiving a control signal;
   a capacitor, comprising a first terminal and a second terminal, the first terminal thereof coupled to the second terminal of the charging switch, the second terminal thereof coupled to a common voltage;
   a reset switch, comprising a first terminal, a second terminal, and a control terminal, the first terminal thereof coupled to the first terminal of the capacitor, the second terminal thereof coupled to the common voltage, the control terminal thereof receiving the control signal; and
   a comparator, comprising a first input terminal, a second input terminal, and an output terminal, the first input terminal thereof coupled to the first terminal of the capacitor, the second input terminal thereof receiving the second reference voltage, the output terminal thereof outputting the control signal;
   wherein, when the voltage of the first terminal of the capacitor is lower than the second reference voltage, the control signal is used for conducting the charging switch and disconnecting the reset switch, when the voltage of the first terminal of the capacitor is larger than the second reference voltage, the control signal is used for conducting the reset switch and disconnecting the charging switch.

5. The power control circuit according to the claim 1, wherein the power converter driving circuit comprises:
   a comparator, comprising a first input terminal, a second input terminal and an output terminal, the first input terminal thereof receiving the time variant saw-tooth voltage, the second input terminal thereof receiving the error voltage, the output terminal thereof outputting a pulse control signal;
   a set-reset latch, comprising a set terminal, a reset terminal, and a Q output terminal, the set terminal thereof receiving a clock signal, the reset terminal thereof coupled to the output terminal of the comparator; and
   a gate driving circuit, comprising an input terminal and an output terminal, the input terminal thereof coupled to the Q output terminal of the set-reset latch, the output terminal thereof outputting a gate driving voltage.

6. The power control circuit according to the claim 5, wherein the power converter driving circuit further comprises:
   a power transistor, comprising a gate terminal, a first source-drain terminal and a second source-drain terminal, the gate terminal thereof coupled to the output terminal of the gate driving circuit to receive the gate driving voltage, the second source-drain terminal thereof coupled to the power converter and outputting the driving pulse;
   an impedance element, comprising a first terminal and a second terminal, the first terminal thereof coupled to the first source-drain terminal of the power transistor, the second terminal thereof receiving a common voltage, the first terminal thereof generating a current sensing voltage corresponding to the current flowing through the power transistor; and
   a mixer, coupled to the first input terminal of the comparator, the saw-tooth generator, and the first source-drain terminal of the power transistor, adapted for mixing the time variant saw-tooth voltage and the current sensing voltage to obtain a mixed saw-tooth voltage and output the mixed saw-tooth voltage to the first input terminal of the comparator.

7. A light emitting diode driver, adapted for driving a light emitting diode series, the light emitting diode driver comprising:
   a power converter, receiving a driving pulse to generate a driving voltage to a first terminal of the light emitting diode series;

a constant current control circuit, coupled to a second terminal of the light emitting diode series to control the current flowing through the light emitting diode series;

a feedback circuit, coupled to the second terminal of the light emitting diode series to generate a feedback voltage;

an error amplifier circuit, for receiving a first reference voltage and the feedback voltage to generate an error voltage;

a saw-tooth generator comprising:
   a variable current source, for generating a time variant current according to a time variant function; and
   a peak detector, for generating a time variant saw-tooth voltage corresponding to the value of the time variant current, wherein the time variant saw-tooth voltage is reset when the time variant saw-tooth voltage is larger than a second reference voltage; and a power converter driving circuit, for receiving the time variant saw-tooth voltage and the error voltage to generate the driving pulse.

8. The light emitting diode driver according to the claim 7, wherein the variable current source comprises:
   a current mirror circuit, comprising a plurality of current output paths, for generating a plurality of specific currents according to a reference current, wherein each of the specific currents are in proportion to the reference current; and
   a plurality of switching devices, wherein a first terminal of each switching device is correspondingly coupled to each of the current output paths, and a second terminal of each switching device is coupled to the peak detector,
   wherein the numbers of the conducted switching devices vary according to the time variant function.

9. The light emitting diode driver according to the claim 8, wherein each of the switching devices further comprises a control terminal, and the variable current source further comprises:
   a clock generating circuit, for generating a clock signal;
   a divider, coupled to the clock generating circuit, for receiving the clock signal and generating a plurality of frequency divided signals, wherein the frequency divided signals have different frequencies;
   a plurality of multiplexing circuits, wherein each multiplexing circuit comprises a selection terminal, a first input terminal, a second input terminal, and a output terminal, the selection terminal of each multiplexing circuit receiving a relatively lowest frequency signal of the frequency divided signals, the first terminal of each multiplexer circuit receiving the corresponding frequency divided signal, and the second terminal of each multiplexing circuit receiving an inverted signal of the corresponding frequency divided signal; and
   a decoder, comprising a plurality of input terminals and a plurality of output terminals, the input terminals of the decoder coupled to the output terminals of the multiplexing circuits to generate a plurality of switching signals and to correspondingly output the switching signals through the output terminals of the decoder, the output terminals of the decoder are respectively coupled to the control terminals of the switching devices,
   wherein the switching signals is used for determining the conducting status of each of the switching devices.

10. The light emitting diode driver according to the claim 7, wherein the peak detector further comprises:
   a charging switch, comprising a first terminal, a second terminal, and a control terminal, the first terminal thereof receiving the time variant current, the control terminal thereof receiving a control signal;
   a capacitor, comprising a first terminal and a second terminal, the first terminal thereof coupled to the second terminal of the charging switch, the second terminal thereof coupled to a common voltage;
   a reset switch, comprising a first terminal, a second terminal, and a control terminal, the first terminal thereof coupled to the first terminal of the capacitor, the second terminal thereof coupled to the common voltage, the control terminal thereof receives the control signal; and
   a comparator, comprising a first input terminal, a second input terminal, and an output terminal, the first input terminal thereof coupled to the first terminal of the capacitor, the second input terminal thereof receiving the second reference voltage, the output terminal thereof outputting the control signal;
   wherein, when the voltage of the first terminal of the capacitor is lower than the second reference voltage, the control signal is used for conducting the charging switch and disconnecting the reset switch, when the voltage of the first terminal of the capacitor is larger than the second reference voltage, the control signal is used for conducting the reset switch and disconnecting the charging switch.

11. The light emitting diode driver according to the claim 7, wherein the power converter driving circuit comprises:
   a comparator, comprising a first input terminal, a second input terminal, and an output terminal, the first input terminal thereof receiving the time variant saw-tooth voltage, the second input terminal thereof receiving the error voltage, the output terminal thereof outputting a pulse control signal;
   a set-reset latch, comprising a set terminal, a reset terminal, and a Q output terminal, the set terminal thereof receiving a clock signal, the reset terminal thereof coupled to the output terminal of the comparator; and
   a gate driving circuit, comprising an input terminal and an output terminal, the input terminal thereof coupled to the Q output terminal of the set-reset latch, the output terminal thereof outputting a gate driving voltage.

12. The light emitting diode driver according to the claim 11, wherein the power converter driving circuit further comprises:
   a power transistor, comprising a gate terminal, a first source-drain terminal and a second source-drain terminal, the gate terminal thereof coupled to the output terminal of the gate driving circuit to receive the gate driving voltage, the second source-drain terminal thereof coupled to the power converter and outputting the driving pulse;
   an impedance element, comprising a first terminal and a second terminal, the first terminal thereof coupled to the first source-drain terminal of the power transistor, the second terminal thereof receiving a common voltage, the first terminal thereof generating a current sensing voltage corresponding to the current flowing through the power transistor; and
   a mixer, coupled to the first input terminal of the comparator, the saw-tooth generator, and the first source-drain terminal of the power transistor, adapted for mixing the time variant saw-tooth voltage and the current sensing voltage to obtain a mixed saw-tooth voltage and output the mixed saw-tooth voltage to the first terminal of the comparator.

13. The light emitting diode driver according to the claim 7, wherein the power converter comprises:
   an inductor, comprising a first terminal and a second terminal, the first terminal thereof receiving a source voltage;
   a rectified diode, comprising an anode and a cathode, the anode thereof coupled to the second terminal of the inductor, the cathode thereof coupled to the light emitting diode series; and
   a capacitor, comprising a first terminal and a second terminal, the first terminal thereof coupled to the cathode of the rectified diode, the second terminal coupled to a common voltage.

* * * * *